Patented Apr. 21, 1925.

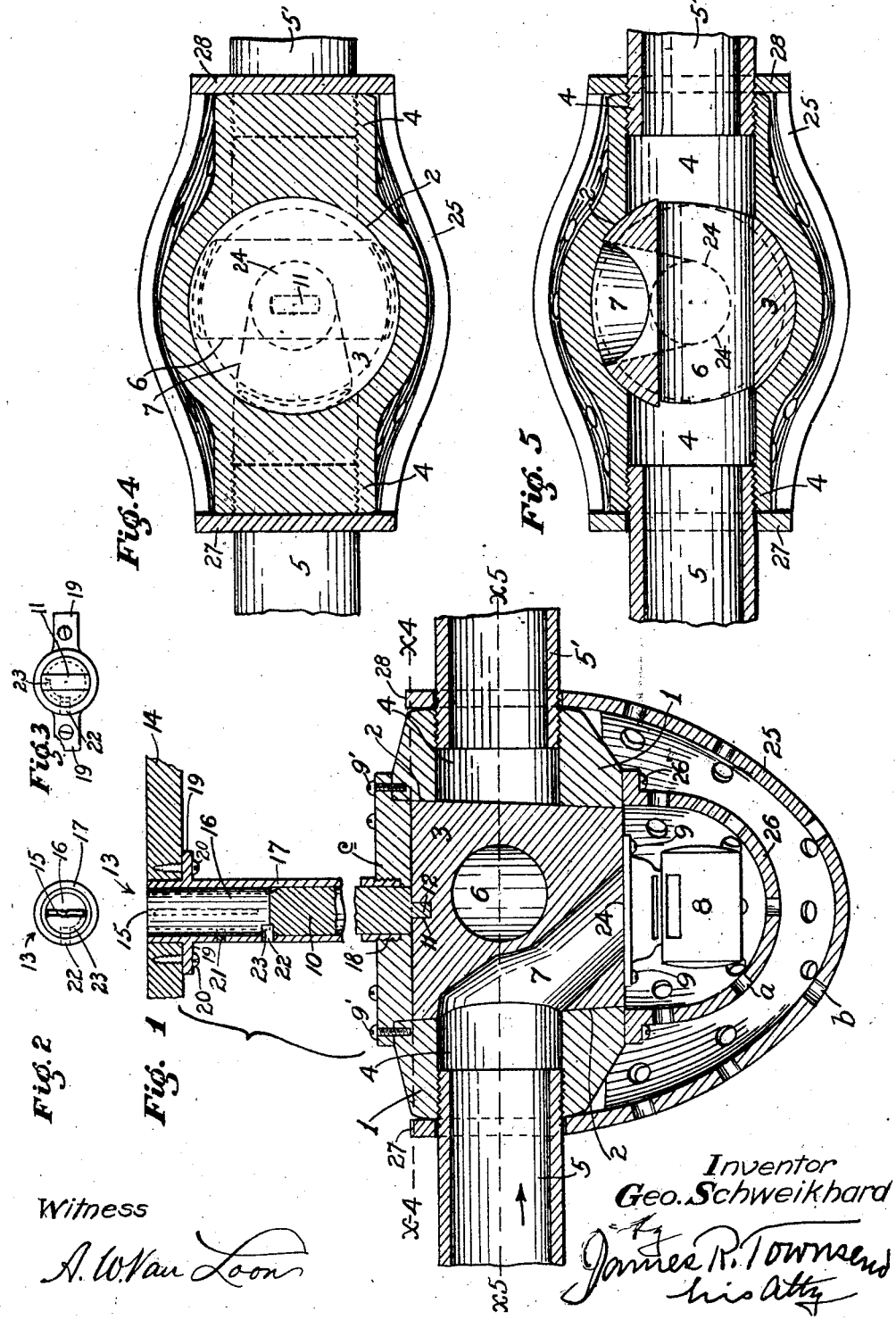

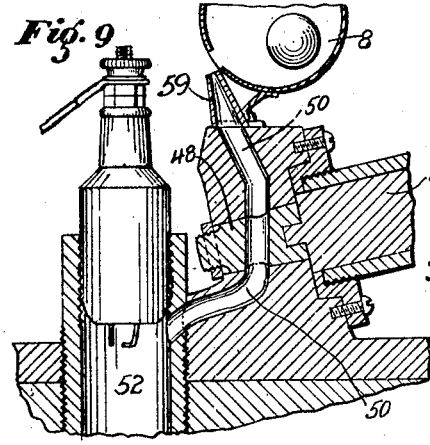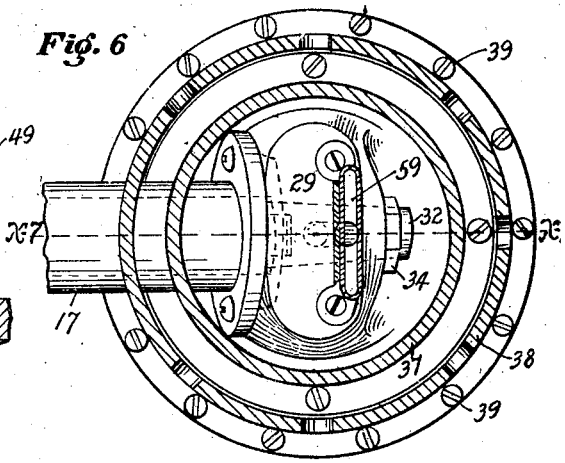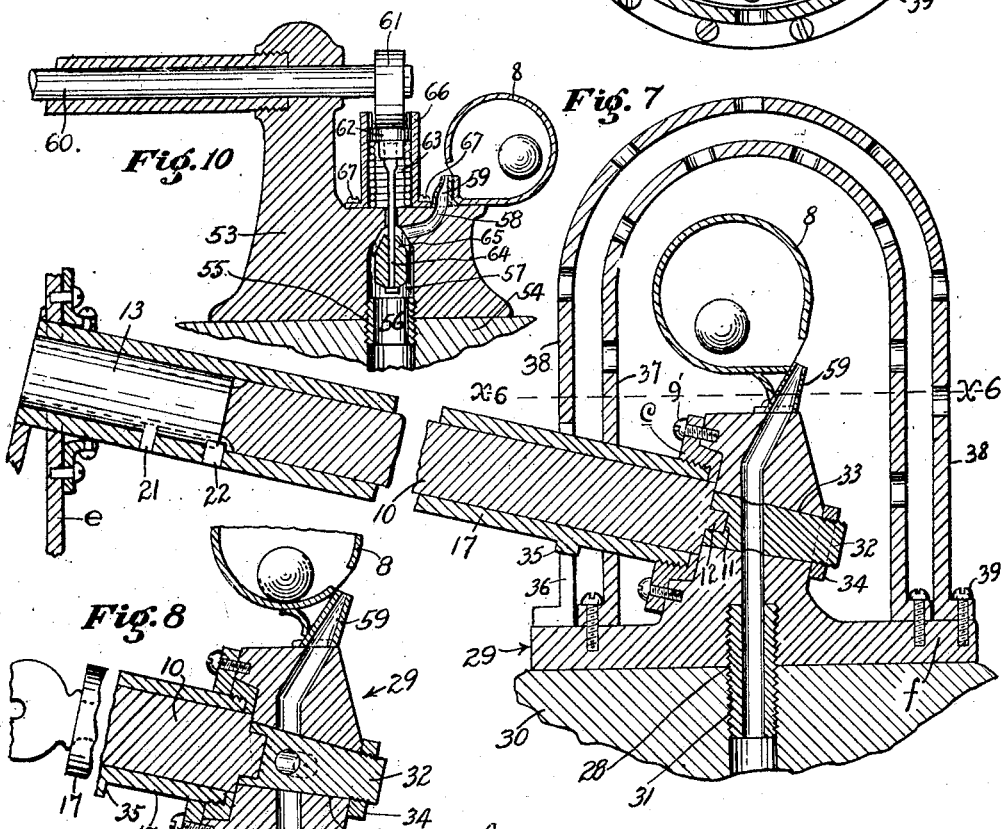

1,534,666

UNITED STATES PATENT OFFICE.

GEORGE SCHWEIKHARD, OF LOS ANGELES, CALIFORNIA.

ANTITHEFT ALARM FOR AUTOMOBILES.

Application filed December 12, 1919. Serial No. 344,474.

*To all whom it may concern:*

Be it known that I, GEORGE SCHWEIKHARD, a citizen of the United States, residing at 152 South Avenue 20, Los Angeles, in the county of Los Angeles and State of California, have invented a new and useful Antitheft Alarm for Automobiles, of which the following is a specification.

This invention relates to the protection of automobiles against theft and I have developed the same in four forms, any one of which when applied, will produce an alarm audible at a distance of two or three city blocks.

It is well known that where automobiles are parked closely on the street and are constantly arriving and leaving, some are likely to be stolen; and an object of this invention is to provide a device with which an automobile may be so equipped that the motor can not be operated without giving such an alarm that the person attempting theft will either abandon the vehicle, or be subjected to capture while trying to drive it away.

Automobiles with protecting devices thereon may be stolen if sufficient time and opportunity are allowed for the removal of the protecting devices and an object of this invention is to provide a protective device that will not be prominent to view and not likely to be noticed, and which affords but little if any clue to the inspector as to whether or not it is a protective device or is set to that purpose.

Another object is to provide a protective device which may be so located that in case its presence is suspected or known, an attempted removal thereof would be likely to arouse the suspicions of passers-by, and its actual removal would require so much time that the likelihood of detection would be sufficient to prevent attempt at theft in practically every instance where persons interested in preventing theft were within sight and hearing.

Another object is to provide a valve which will not be affected by the carbon deposit in the exhaust pipes.

This invention relates to devices of a character calculated to avoid the necessity of attaching the protective appliances to the automobile at each stop where protection is deemed necessary, and which duty persons often neglect in view of the short time they expect the car to remain unattended.

Another object is to provide means to guard against the likelihood of inadvertently driving the automobile off while the key to the protective device is left at home.

The invention may be carried out in various ways and a principle thereof is the use of the running motor to sound an alarm through means that are locked in alarm position when the car is placed under its protection. I propose to utilize the power at the exhaust pipe, at the petcock port or at the spark plug port, preferably utilizing the power at the exhaust pipe.

The motor cylinder or the like may be especially formed to apply an expansive fluid to the sounder for giving an alarm when the motor is operated while the device is set for alarm; but it is deemed sufficient for this disclosure to illustrate the invention as applied to the ports of the motor cylinder above specifically named; it being understood that other constructions are contemplated as within the scope of the appended claims.

Other objects, advantages and features of invention may appear from the accompanying drawings, the subjoined detailed description and the appended claims.

The accompanying drawings illustrate the invention.

Figure 1 is a cross-sectional elevation of the invention shown as adapted to use on the exhaust pipe of the motor, with valve turned into position to sound the alarm.

Fig. 2 is a plan view of the lock, and comprises all of the device that is to be seen from within the automobile when the floor mat or other concealing device therefor, not shown, is moved aside.

Fig. 3 is bottom end view of the key-rod and sleeve, detached.

Fig. 4 is a sectional plan of the invention taken at line $x^4$, Fig. 1.

Fig. 5 is a sectional plan taken at line $x^5$ Fig. 1 with the valve turned so as to make the alarm non-operative, but to carry off the exhaust of the engine.

Fig. 6 is a plan partly in section on line $x^6$, Fig. 7, showing the invention as adapted to connect at the pet-cock hole and to be controlled from the dash-board.

Fig. 7 is a fragmental sectional view taken at line $x^7$, Fig. 6, showing the valve in position to sound the whistle.

Fig. 8 is a view analogous to Fig. 7, omitting the guards and showing the valve revolved 90 degrees from the position of Fig.

7, to a non-signaling position.

Fig. 9 is a view analogous to Figs. 7 and 8, showing the alarm as applied at the spark plug hole.

Fig. 10 is a sectional elevation of a model different from any of the foregoing, but embracing the same idea of alarm means and adapted for use at either the pet-cock hole or the spark plug hole.

In the form shown in Figs. 1-5 a valve body 1 is provided with a bore 2 to receive the valve plug 3 which extends entirely through said body; and said body is also provided with the ports 4, threaded to receive the sections 5, 5' of the exhaust pipe, into a break of which pipe said valve body is introduced. The valve plug 3 is provided with a transverse bore 6 adapted to register with the exhaust ports 4 when the plug is turned in one direction, and said plug is also provided with an oblique passage 7 extending from one side of the plug to the end of the plug, and terminating at the axis of said plug. The plug is thus adapted to afford free communication through the exhaust port 6 from one exhaust pipe section to the other, and when the plug is turned in one direction said port 7 is adapted to communicate with the exhaust pipe section 5 from the motor and to direct the exhaust away from the outlet exhaust pipe section 5'. A sounder 8 adapted to be blown by exhaust directed thereto, through the oblique passage 7, is fixed to the valve plug by screws 9.

The valve plug 3 may be held in place by any suitable means and is adapted to be operated by any suitable means controlled by a suitable lock which may be of any desired or suitable character. In the drawings the lock is a key-operated lock and when the key is inserted and turned, it revolves a rod 10 which is connected by suitable means as the mortise and tenon 11, 12, to revolve the valve plug 3.

As shown in Fig. 1, while valve plug 3 remains in position to close exhaust pipe 5, 5', said oblique passage 7 leads from exhaust pipe 4 to the sounder which may be of any desired character and is shown as police whistle.

Valve plug 3 is held in the housing by a cover c fastened to the housing screws 9'. The valve is adapted to be operated by rod 10 which extends through the cover c, and engages valve plug 3 with the mortise and tenon connection 11, 12. Said rod 10 leads vertically to lock 13 which is let into the floor 14 of the vehicle and there only the key-hole end 15 of said lock is exposed, and it is flush with the floor 14. The upper end of operating rod 10 is secured to the bottom of the lock cylinder 16 by swetting-on or some other suitable means.

The sleeve 17 which acts as a housing and guard for rod 10 and lock 13 is secured at its lower end to cover c by a threaded connection 18 and is secured at its upper end by flanges 19 and screws 20 to the floor 14 of the automobile.

Lock 13 is fastened in the upper end of sleeve 17 by a pin 21 and the rotary action of lock cylinder 16 is limited to a desired arc by detent 22 which engages a notch 23 at base of said cylinder. Lock 16 is so connected with rod 10 that the key, not shown, can be removed only when the device is set for signal.

The whistle 8 is shown as placed on the bottom of valve plug 3 and is rotatable therewith and is opened to the outlet 24 of the oblique passage 7.

Guards 25, 26, of suitable material, as malleable metal are designed to protect the sounder against injury. The outer guard 25 is attached by loops 27, 28 around the exhaust pipe 5, 5'; such attachment being made possible by removing the separated end 5' which may be secured to the floor of the auto with the usual pipe straps, not shown.

The inner guard 26 is secured to the valve housing by screws 26', and both guards 25, 26 are perforated to emit the sound of alarm, the perforations a, b, being arranged in the two respective guards in staggered or alternating positions.

An advantage of the structure set forth above is that the valve, due to its being rotary instead of the wing type, will not become clogged or obstructed by carbon deposits in the exhaust pipe. Such deposits are likely to become lodged under the wing type valve and thereby prevent the valve from tightly closing and which will result in the signal means being sounded during such times as it is not desired to be sounded.

A further advantage is that if a would-be thief should succeed in removing the portion 5 of the exhaust pipe a solid portion of the valve 3 would close such opening and prevent the insertion of a rod to open the valve.

The form illustrated in Figs. 6, 7 and 8 embraces the principal ideas of means conveyed in the foregoing description, but is adapted to be applied to the engine at the pet-cock hole 28 and is controlled through the lock 13 at the dash-board e.

The body 29 is secured to engine 30 by a nipple 31 which screws tightly into place to hold the body 29 on the engine 30.

The valve 32 revolves in bearing 33, being held secure by nut 34, and is connected with rod 10 in the manner described with respect to Figs. 1-5. The lug 35 and the walls of slot 36 in the outer guard 38 preclude the possibility of unscrewing the protecting sleeve 17 in an attempt to dismantle the device, while the outer guard 38 is in place.

The perforated double-walled guard in Figs. 6, 7, 8, is similar to that described in connection with the foregoing views, but the inner guard 37 is penetrated by operating rod 10 and sleeve 17 which arrangement reinforces both rod 10 and guard 38. Said guard 38 is secured to base f, with so many screws 39, that considerable time is required to unscrew the screws, before the guard may be detached.

The form shown in Fig. 9 is similar in principle to the one shown in Figs. 6, 7 and 8, but is adapted to be applied at the sparkplug.

From the dash-board, not shown, the valve 48 is turned by rod 49 and opens or closes the power duct 50 which registers with the whistle 8 at its upper end and with the spark tube 52 at its lower end.

The form illustrated in Fig. 10 is adapted for use at the pet-cock hole or spark plug hole with special connection as shown in Fig. 9, and embraces the same idea of alarm means as is disclosed in foregoing views; but is of different construction and comprises a body 53 which is secured on top of the engine 54 over the pet-cock hole 55 by a stout nipple 56. The passage up to the petcock hole is continued upward into body 53 by channel 57 which leads to conduit 58 then to the receiving tube 59 of the whistle 8 when set for alarm as shown in said Fig. 10. But when the operating rod 60 which is controlled in manner similar to the two previously described forms, is turned one-half a revolution, the cam 61 which articulates with compresser 62 releases the spring 63 which forces upward compresser 62 drawing with it the pivotally attached rod 64 and plug 65, thus closing the passage to the whistle.

The well 66 is provided as a guide and support for spring 63 and is secured to the body by screws 67.

When the plug 65 is drawn up into position to close the conduit 58 against the force of explosion it is in position to be driven up even more tightly by the explosive force; but upon being released by the shifting of the cam 63, said explosive force is allowed to escape around the plug 65, through conduit 58 to sound an alarm.

I claim:

1. An automobile anti-theft device including in combination with an explosive engine, an alarm actuated by the exploded gas of said engine; a valve having a valve plug provided with a passageway therethrough for directing the exploded gas to said alarm, said alarm being mounted on said valve plug and means whereby said valve can be locked in operative and inoperative positions for the purpose as set forth, and means for permitting the exploded gas to escape without sounding said alarm when said valve is locked in inoperative position.

2. An automobile anti-theft device including in combination with an explosive engine, a valve, a valve plug having passageways therethrough, one of said passageways allowing the exhaust to pass uninterruptedly from said engine, an alarm mounted on said valve plug and actuated by the exhaust of said engine, and means whereby the other passageway can be locked in position for directing said exhaust to said alarm.

3. An automobile anti-theft device including in combination with an explosive engine, an exhaust for conducting the exhaust from said engine, an alarm device mounted transversely of said pipe; said alarm comprising a body adapted to receive sections of said pipe, a valve plug in said body, an alarm sounding device mounted on said plug; said plug having transverse and oblique passageways, and means whereby said oblique passageway may be locked in position for directing the exhaust to sound said alarm during the operation of the engine.

4. An automobile anti-theft device including in combination with an explosive engine, an exhaust pipe for conducting the exhaust from said engine, an alarm device mounted transversely of said pipe, said device comprising a body adapted to receive sections of said pipe, a valve plug in said body, an alarm sounding device mounted on said plug; said alarm sounding device being protected by a double walled enclosure, said walls being respectively perforated and said perforations being in staggered relation, said plug having transverse and oblique passageway, and means whereby said oblique passageway may be locked in position for directing the exhaust to sound said alarm during the operation of the engine; said locking means being controlled from a key hole in the floor of the automobile.

5. An automobile anti-theft device comprising a valve body adapted to be attached to an exhaust pipe of an automobile, a rotary valve in said body, and audible signal means rotatable with said valve.

6. An automobile anti-theft device including in combination with an explosive engine, an exhaust pipe for conducting the exhaust from said engine, an alarm device mounted transversely of said pipe and comprising a whistle; and an alternating valve having transverse and oblique passageways which opens and closes the passage leading from the exhaust pipe to the whistle for the purpose as set forth, said whistle being mounted on said valve.

7. An automobile anti-theft device including in combination with an engine, an exhaust pipe for conducting the exhaust from said engine, an alarm device comprising a body adapted to receive sections of said pipe, a valve plug in said body, an alarm sounding device mounted on said plug, said body having an inner guard fastened thereto for protection of said alarm, an outer guard encircling said inner guard and the sections of said pipe; said guards being perforated to allow the sound to escape; means controlled by lock and key from the interior of the automobile for operating the valve; said valve being provided with two bores so arranged as to conduct the exhaust of said engine through either of said bores into a desired channel for the purpose of alternatively sounding or not sounding said alarm when the engine is running.

8. An automobile anti-theft device including in combination with a valve body having ports and an alternating valve plug having ports to be moved into and out of register with the ports of said body, an alarm member mounted on said valve plug, and lock and key controlling means for said valve plug, said valve plug having transverse and oblique passageways therein.

9. An automobile anti-theft device comprising in combination with an engine, an alternating valve having a rotary valve plug, an alarm member mounted on the rotary valve plug, said valve plug having an opening therein for conducting an expansive fluid from the engine to said alarm member for sounding the alarm when the engine is running and the valve is in a predetermined position.

In testimony whereof, I have hereunto set my hand at Los Angeles, California, this 5th day of December, 1919.

GEORGE SCHWEIKHARD.

Witness:
JAMES R. TOWNSEND.